United States Patent
Mohri et al.

(10) Patent No.: US 10,752,758 B2
(45) Date of Patent: Aug. 25, 2020

(54) INSULATING RESIN COMPOSITION FOR DC POWER CABLE, CROSSLINKED RESIN BODY, DC POWER CABLE, MEMBER FOR FORMING REINFORCING INSULATING LAYER OF DC POWER JOINT, AND DC POWER CABLE JOINT

(71) Applicants: NUC Corporation, Tokyo (JP); Furukawa Electric Co., Ltd., Tokyo (JP)

(72) Inventors: Hironori Mohri, Tokyo (JP); Nobutaka Yuzawa, Tokyo (JP); Takeshi Tachikawa, Tokyo (JP); Anna Aso, Tokyo (JP); Hiroki Mori, Tokyo (JP); Naoto Shigemori, Tokyo (JP); Saki Shigemori, Tokyo (JP)

(73) Assignees: NUC Corporation, Tokyo (JP); Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 16/269,853

(22) PCT Filed: Jul. 26, 2017

(86) PCT No.: PCT/JP2017/027132
§ 371 (c)(1),
(2) Date: Feb. 7, 2019

(87) PCT Pub. No.: WO2018/030160
PCT Pub. Date: Feb. 15, 2018

(65) Prior Publication Data
US 2019/0375925 A1    Dec. 12, 2019

(30) Foreign Application Priority Data
Aug. 9, 2016    (JP) .................. 2016-156483

(51) Int. Cl.
*H01B 7/00*    (2006.01)
*C08L 23/06*    (2006.01)
(Continued)

(52) U.S. Cl.
CPC .............. *C08L 23/06* (2013.01); *H01B 3/441* (2013.01); *H01B 9/027* (2013.01); *H02G 15/18* (2013.01);
(Continued)

(58) Field of Classification Search
CPC . H01B 3/02; H01B 3/04; H01B 3/441; H01B 9/02; H01B 9/04; H01B 9/027;
(Continued)

(56) References Cited

U.S. PATENT DOCUMENTS

| | | |
|---|---|---|
| 7,196,267 B2 | 3/2007 | Sekiguchi et al. |
| 2013/0211008 A1* | 8/2013 | Shirodkar ............... C08F 36/04 525/209 |

(Continued)

FOREIGN PATENT DOCUMENTS

| | | |
|---|---|---|
| CN | 103613828 | 3/2014 |
| CN | 105367869 | 3/2016 |

(Continued)

*Primary Examiner* — William H. Mayo, III
(74) *Attorney, Agent, or Firm* — Muramatsu & Associates (57) ABSTRACT

An insulating resin composition for a DC power cable improves DC electrical properties and extrusion stability, and includes (A) a low-density polyethylene having a complex viscosity $\eta^*_{100}$, which is measured at 130° C. and a frequency of 100 rad/s, of 600 to 1,300 Pa·s, wherein a ratio ($\eta^*_{0.1}/\eta^*_{100}$) of a complex viscosity $\eta^*_{0.1}$, which is measured at 130° C. and a frequency of 0.1 rad/s, to the complex viscosity $\eta^*_{100}$ is 4 or more; (B) a modified polyethylene; and (C) a stabilizer including a mixture of a hindered phenol antioxidant and a thioether antioxidant. The amount of carbonyl groups introduced into the resin composition (Continued)

through the component (B) is $7\times10^{-6}$ to $1.3\times10^{-5}$ mol/g relative to the total mass of the component (A), the component (B), and the component (C).

12 Claims, 2 Drawing Sheets

(51) Int. Cl.
    *H01B 3/44*     (2006.01)
    *H01B 9/02*     (2006.01)
    *H02G 15/18*     (2006.01)

(52) U.S. Cl.
    CPC ..... *C08L 2201/08* (2013.01); *C08L 2203/202* (2013.01); *C08L 2205/025* (2013.01); *C08L 2207/066* (2013.01); *C08L 2312/00* (2013.01)

(58) Field of Classification Search
    CPC ......... H01B 11/02; H01B 11/04; C08L 23/06; C08L 2203/202; C08L 2205/025; C08L 2207/066; C08L 2312/00; H02G 15/18
    USPC ................. 174/102 R, 103, 108, 109, 110 R, 174/110 PM, 120 R, 120 SC
    See application file for complete search history.

(56) References Cited

U.S. PATENT DOCUMENTS

| | | | | |
|---|---|---|---|---|
| 2013/0211009 A1* | 8/2013 | Yang | .................... | C08L 23/0815 525/225 |
| 2013/0216812 A1* | 8/2013 | Cheng | ....................... | C08L 9/00 428/220 |
| 2013/0224463 A1* | 8/2013 | Shirodkar | ............... | C08L 23/06 428/220 |
| 2014/0155553 A1* | 6/2014 | Shirodkar | ........... | C08L 23/0815 525/240 |
| 2016/0243799 A1* | 8/2016 | Oshima | ..................... | B32B 7/12 |
| 2016/0272798 A1* | 9/2016 | Cheng | ................. | C08L 23/0815 |

FOREIGN PATENT DOCUMENTS

| | | |
|---|---|---|
| JP | H08-7653 | 1/1996 |
| JP | 3425050 | 5/2003 |

\* cited by examiner

INSULATING RESIN COMPOSITION FOR DC POWER CABLE, CROSSLINKED RESIN BODY, DC POWER CABLE, MEMBER FOR FORMING REINFORCING INSULATING LAYER OF DC POWER JOINT, AND DC POWER CABLE JOINT

This is a continuation of International Application No. PCT/JP2017/027132 filed Jul. 26, 2017 which claims the benefit of priority of Japanese Patent Application No. 2016-156483, filed Aug. 9, 2016, the entire contents of which are incorporated herein by reference.

TECHNICAL FIELD

The present invention relates to an insulating resin composition for a DC power cable, a crosslinked resin body obtained by crosslinking the resin composition, a DC power cable including an insulating layer made of the crosslinked resin body, a member for forming a reinforcing insulating layer of a DC power cable joint, the member being used in connecting DC power cables together, and a DC power cable joint including a reinforcing insulating layer made of the crosslinked resin body.

BACKGROUND ART

Conventionally, AC transmission systems have been widely used to transmit power.

However, when AC transmission is used for long-distance power transmission, a great power transmission loss is caused, and therefore DC power transmission systems are sometimes used for long-distance power transmission.

As cables (DC power cables) for DC power transmission systems, oil-filled isolated cables have been widely used.

However, oil-filled isolated cables require regular maintenance of booster pumps and the like in order to keep insulating oil in the cables. When the insulating oil is flowed out, an influence on the environment will be problematic.

To overcome this, a DC power cable including an insulating layer made of an insulating resin composition is disclosed as a DC power cable that is easy to maintain and has no risk of oil leakage (see PTL 1 below).

CITATION LIST

Patent Literature

PTL 1: Japanese Unexamined Patent Application Publication No. 8-7653

SUMMARY OF INVENTION

Technical Problem

However, conventionally known insulating resin compositions for DC power cables, including the insulating resin composition described in the above patent literature, have the following problems.

(1) Since torque in extruding a resin composition is high, an extruder is subjected to a heavy load. This makes it difficult to operate the extruder at a high rotation rate and limits the extrusion speed (the efficiency in cable production).

As a DC power cable used for long-distance power transmission, a long cable, for example, a cable having a length of several kilometers to several hundred kilometers has been demanded.

However, such a long cable is difficult to produce because an initial resin pressure in extrusion is high and an allowable resin pressure set to prevent screen mesh breakage which may be caused, for example, by clogging with foreign matter is reached in a short time.

(2) A resin composition (extrudate) discharged from an extruder head tends to sag. The sag leads to a cable insulator with low circularity, and the electrical insulation properties of a DC power cable to be obtained are degraded.

(3) Since scorching (burning of a resin composition in an extruder) is likely to occur during extrusion, it is difficult to produce a long cable.

(4) Since a large amount of secondary decomposition water is generated during reheating, for example, in connecting cables together, insulation performance tends to degrade.

As used herein, "the amount of secondary decomposition water generated during reheating" refers to the amount of water generated when a crosslinked resin body obtained by crosslinking the resin composition is heated.

In this description, the term "reheating" is used because it is heating performed after heating for crosslinking the resin composition, and the phrase "the amount of secondary decomposition water" is used to distinguish from the amount of water generated by the heating for crosslinking the resin composition (the amount of primary decomposition water).

(5) The insulating resin composition for a DC power cable is also required to be capable of forming a crosslinked resin body that stably exhibits good DC electrical properties.

(6) In addition, the insulating resin composition for a DC power cable is required to have a stable resin pressure when extruded and to form an insulating layer with no variation in thickness (little wall thickness deviation).

The present invention was made in view of the circumstances as described above. An object of the present invention is to provide an insulating resin composition for a DC power cable, which insulating resin composition has the following features: it generates appropriate torque when extruded and has excellent extrudability; its extrudate is unlikely to experience sagging which may lead to a cable insulator with low circularity; it has good scorch resistance; it can form an insulating layer (crosslinked resin body) that generates a smaller amount of secondary decomposition water during reheating in connecting cables together and that stably exhibits good DC electrical properties; and it has a stable resin pressure when extruded, has high extrusion stability, and can form an insulating layer with little variation in thickness (wall thickness deviation).

Another object of the present invention is to provide a crosslinked resin body that is obtained by crosslinking the above resin composition and can form an insulating layer that can stably exhibit good DC electrical properties, generates a smaller amount of secondary decomposition water during reheating, and can reduce performance-degrading factors such as the occurrence of water treeing.

Still another object of the present invention is to provide a DC power cable including an insulating layer made of the above crosslinked resin body.

Still another object of the present invention is to provide a member for forming a reinforcing insulating layer of a DC power cable joint, the member being made of the above resin composition.

Still another object of the present invention is to provide a DC power cable joint including a reinforcing insulating layer made of the above crosslinked resin body.

Solution to Problem

[1] An insulating resin composition for a DC power cable according to the present invention includes:

(A) 100 parts by mass of a low-density polyethylene having a complex viscosity $\mu^*_{100}$, which is measured at 130° C. and a frequency of 100 rad/s, of 600 to 1,300 Pa·s, wherein a ratio ($\eta^*_{0.1}/\eta^*_{100}$) of a complex viscosity $\eta^*_{0.1}$, which is measured at 130° C. and a frequency of 0.1 rad/s, to the complex viscosity $\eta^*_{100}$ no is 4 or more;

(B) 5 to 12 parts by mass of a modified polyethylene obtained by grafting a polyethylene with at least one modifying monomer selected from unsaturated organic acids and derivatives thereof; and (C) 0.01 to 0.8 parts by mass of a stabilizer including a mixture of 40% to 60% by weight of a hindered phenol antioxidant and 60% to 40% by weight of a thioether antioxidant, wherein the amount of carbonyl groups introduced into the resin composition through the component (B) is $7\times10^{-6}$ to $1.3\times10^{-5}$ mol/g relative to the total mass of the component (A), the component (B), and the component (C).

Since the complex viscosity $\eta^*_{100}$ of the low-density polyethylene that is the component (A) is 600 to 1,300 Pa·s, the resin composition of the present invention generates appropriate torque when extruded and has excellent extrudability.

Since the ratio ($\eta^*_{0.1}/\eta^*_{100}$) in the low-density polyethylene is 4 or more, an extrudate of the resin composition is unlikely to experience sagging, which enables the circularity of a cable insulator to be kept high.

Since the stabilizer containing a thioether antioxidant in an amount of 40% by mass or more and a hindered phenol antioxidant in an amount of 60% by mass or less is contained in an amount of 0.01 to 0.8 parts by mass, the resin composition has good scorch resistance.

Since the stabilizer containing a thioether antioxidant in an amount of 60% by mass or less and a hindered phenol antioxidant in an amount of 40% by mass or more is contained in an amount of 0.01 to 0.8 parts by mass, the amount of secondary decomposition water generated during reheating, for example, in connecting cables together can be smaller.

Since the amount of carbonyl groups relative to the total mass of the component (A), the component (B), and the component (C) is $7\times10^{-6}$ mol/g or more, the resin composition can form an insulating layer (crosslinked resin body) that stably exhibits good DC electrical properties.

Since the amount of carbonyl groups relative to the total mass of the component (A), the component (B), and the component (C) is $1.3\times10^{-5}$ mol/g or less, the resin composition has a stable resin pressure when extruded, has high extrusion stability, and can form an insulating layer with little variation in thickness (wall thickness deviation).

[2] In the insulating resin composition for a DC power cable according to the present invention, the component (B) is preferably obtained by grafting a low-density polyethylene that satisfies the requirements for the component (A) with the modifying monomer.

[3] The insulating resin composition for a DC power cable according to the present invention preferably further contains (D) 0.1 to 5 parts by mass of an organic peroxide.

[4] In the resin composition of [3] above, the component (D) preferably has a melting point of 60° C. or lower, and the decomposition time (half-life) at 130° C. of the component (D) is preferably 1 to 5 hours.

[5] In the insulating resin composition for a DC power cable according to the present invention, the component (B) is preferably a modified polyethylene obtained by grafting a polyethylene with at least one modifying monomer selected from unsaturated dicarboxylic acids, unsaturated dicarboxylic anhydrides, and unsaturated dicarboxylic acid derivatives.

[6] In the insulating resin composition for a DC power cable according to the present invention, the component (B) is preferably a modified polyethylene obtained by grafting a polyethylene with maleic anhydride (MAH).

[7] A crosslinked resin body of the present invention is obtained by crosslinking the resin composition of the present invention.

[8] In the crosslinked resin body of the present invention, the amount of water generated by heating at 180° C. for 3 hours is preferably 100 ppm or less.

[9] In the crosslinked resin body of the present invention, an increase in electric field enhanced by internally accumulated charges is preferably 25% or less, the increase in electric field being determined by space charge measurement.

[10] In a DC power cable of the present invention, an inner semiconductive layer and an insulating layer made of the crosslinked resin body of the present invention are disposed in layers around the surface of a conductive member.

[11] A member for forming a reinforcing insulating layer according to the present invention includes the resin composition of the present invention. The member is a tape-shaped repair member that, in connecting DC power cables together, is wound around a joint inner semiconductive layer covering exposed portions of conductive members of the DC power cables, the exposed portions including a joint between the conductive members, and is crosslinked to form a reinforcing insulating layer around the joint inner semiconductive layer.

[12] In a DC power cable joint of the present invention, DC power cables are connected together, and a reinforcing insulating layer made of the crosslinked resin body of the present invention is formed around a joint inner semiconductive layer covering exposed portions of conductive members of the DC power cables, the exposed portions including a joint between the conductive members.

Advantageous Effects of Invention

The resin composition of the present invention has the following features: it generates appropriate torque when extruded and has excellent extrudability; its extrudate is unlikely to experience sagging which may lead to a cable insulator with low circularity; it has good scorch resistance; it can form an insulating layer (crosslinked resin body) that generates a smaller amount of secondary decomposition water during reheating in connecting cables together and that stably exhibits good DC electrical properties; and it has a less variable resin pressure when extruded, has high extrusion stability, and can form an insulating layer with little variation in thickness (wall thickness deviation).

The crosslinked resin body of the present invention is obtained by crosslinking the above resin composition and can form an insulating layer that can stably exhibit good DC electrical properties, generates a smaller amount of secondary decomposition water during reheating, and can suppress the occurrence of water treeing.

The DC power cable of the present invention has high circularity, can exhibit good DC electrical properties, and has excellent insulation properties because of its high DC breakdown electric field (absolute value).

The DC power cable joint of the present invention has excellent insulation properties because of its high DC breakdown electric field (absolute value).

DESCRIPTION OF EMBODIMENTS

A resin composition of the present invention contains a component (A) including a low-density polyethylene, a component (B) including a modified polyethylene, and a component (C) including a stabilizer.

<Component (A)>

The component (A) of the resin composition of the present invention has a complex viscosity $\eta^*_{100}$, which is measured at 130° C. and a frequency of 100 rad/s, of 600 to 1,300 Pa·s, preferably 700 to 1,200 Pa·s.

A resin composition containing a low-density polyethylene having an $\eta^*_{100}$ of less than 600 Pa·s fails to form a crosslinked resin body having sufficient mechanical strength.

A resin composition containing a low-density polyethylene having an $\eta^*_{100}$ of more than 1,300 Pa·s generates excessively high torque when extruded (see Comparative Example 1 and Comparative Example 2 below).

When torque in extrusion is excessively high, an extruder is subjected to a heavy load, which makes it difficult to operate the extruder at a high rotation rate and limits the extrusion speed (the efficiency in cable production). In addition, an initial resin pressure in extrusion is high, and therefore an allowable resin pressure set to prevent screen mesh breakage which may be caused by clogging with foreign matter is reached in a short time, thus making it difficult to produce a long cable.

In the component (A), the ratio ($\eta^*_{0.1}/\eta^*_{100}$) of a complex viscosity $\eta^*_{0.1}$, which is measured at 130° C. and a frequency of 0.1 rad/s, to the complex viscosity $\eta^*_{100}$, which is measured at 130° C. and a frequency of 100 rad/s, is 4 or more, preferably 20 or more.

When the ratio ($\eta^*_{0.1}/\eta^*_{100}$) is less than 4, a resin composition (extrudate) discharged from an extruder head tends to sag (see Comparative Example 3 below).

The sag leads to a cable insulator with low circularity, and the electrical insulation properties of a DC power cable to be obtained are degraded.

An example of commercially available products of the component (A) is "DFD-0118" (NUC Corporation).

<Component (B)>

The component (B) of the resin composition of the present invention is a modified polyethylene obtained by grafting a polyethylene with at least one modifying monomer selected from unsaturated organic acids and derivatives thereof.

The polyethylene to be modified is preferably a low-density polyethylene that satisfies the requirements for the component (A), from the viewpoint of compatibility with the component (A).

Examples of functional groups introduced by the modifying monomer include functional groups having a C=O bond, such as a carbonyl group (>C=O), a carboxyl group (—COOH), an ester group, an acid anhydride, an amide group, and an imide group.

The carbonyl group (>C=O) in a molecular chain traps charges injected from an electrode, whereby localization of space charges can be inhibited.

Examples of preferred modifying monomers include unsaturated dicarboxylic acids, unsaturated dicarboxylic anhydrides, and unsaturated dicarboxylic acid derivatives.

Specific examples of unsaturated dicarboxylic acids include maleic acid, fumaric acid, and itaconic acid. Specific examples of unsaturated dicarboxylic anhydrides include maleic anhydride and itaconic anhydride. Specific examples of unsaturated dicarboxylic acid derivatives include monomethyl maleate, monoethyl maleate, diethyl maleate, monomethyl fumarate, dimethyl fumarate, diethyl fumarate, maleic acid monoamide, maleimide, N-phenylmaleimide, and N-cyclohexylmaleimide. These can be used alone or in a combination of two or more.

Of these, maleic anhydride is preferred.

The content of the component (B) is 5 to 12 parts by mass, preferably 8 to 12 parts by mass, relative to 100 parts by mass of the component (A).

When the content of the component (B) is less than 5 parts by mass, it is difficult to uniformly disperse the component (B) in the component (A). In this case, space charges are likely to localize, and as a result, the increase in electric field enhanced by the space charges accumulated in a cable insulator becomes excessive (e.g., 25% or more), leading to a DC power cable of low performance.

More than 12 parts by mass of the component (B) leads to low extrudability.

The component (B) may be prepared, for example, by mixing a low-density polyethylene, an antioxidant, a modifying monomer, and an organic peroxide in an extruder, heating the mixture to effect a reaction, and granulating the reaction product into pellets or granules.

The antioxidant used in preparing the component (B) is deactivated while the component (B) is synthesized and does not constitute the component (C) in the resin composition.

<Component (C)>

The component (C) of the resin composition of the present invention is a stabilizer including a mixture of 40% to 60% by weight of a hindered phenol antioxidant and 60% to 40% by weight of a thioether antioxidant.

By virtue of containing the stabilizer, which includes a thioether antioxidant in an amount of 40% by mass or more, in an amount described below, the resin composition of the present invention has good scorch resistance.

By virtue of containing a thioether antioxidant in an amount of 60% by mass or less (containing a hindered phenol antioxidant in an amount of 40% by mass or more) in the stabilizer, the amount of secondary decomposition water of a crosslinked resin body formed from the resin composition of the present invention can be reduced.

In the component (C), the mixing ratio (by mass) of the hindered phenol antioxidant to the thioether antioxidant is typically 40:60 to 60:40, preferably 45:55 to 55:45.

Less than 40% by mass of a thioether antioxidant (more than 60% by mass of a hindered phenol antioxidant) provides a resin composition that cannot exhibit good scorch resistance (see Comparative Example 4 below).

Since thioether antioxidants react with cumyl alcohol, which is a decomposed residue of dicumyl peroxide suitable as the component (D), to generate secondary decomposition water, more than 60% by mass of a thioether antioxidant (less than 40% by mass of a hindered phenol antioxidant)

provides a resin composition that cannot form a crosslinked resin body that generates a smaller amount of secondary decomposition water (see Comparative Example 5 below).

Specific examples of hindered phenol antioxidants include tetrakis[methylene-3-(3',5'-di-t-butyl-4'-hydroxyphenyl)propionate]methane (Irganox 1010 available from BASF), 1,6-hexanediol-bis[3-(3,5-di-t-butyl-4-hydroxyphenyl)propionate] (Irganox 259 available from BASF), octadecyl-3-(3,5-di-t-butyl-4-hydroxyphenyl)propionate (Irganox 1076 available from BASF), and isooctyl-3-(3,5-di-t-butyl-4-hydroxyphenyl)propionate (Irganox 1135 available from BASF). A particularly preferred hindered phenol antioxidant is, for example, tetrakis[methylene-3-(3',5'-di-t-butyl-4'-hydroxyphenyl)propionate]methane. These can be used alone or in a combination of two or more.

Specific examples of thioether antioxidants include 4,4'-thiobis-(3-methyl-6-t-butylphenol) (Seenox BCS available from SHIPRO KASEI KAISHA, LTD.) and 2,2'-thiobis-(4-methyl-6-t-butylphenol) (Irganox 1081 available from BASF). A particularly preferred thioether antioxidant is, for example, 4,4'-thiobis-(3-methyl-6-t-butylphenol). These can be used alone or in a combination of two or more.

The content of the component (C) is 0.01 to 0.8 parts by mass, preferably 0.2 to 0.6 parts by mass, relative to 100 parts by mass of the component (A).

Less than 0.01 parts by mass of the component (C) provides a resin composition with poor scorch resistance, and a crosslinked resin body obtained by crosslinking the resin composition is provided with poor heat resistance.

More than 0.8 parts by mass of the component (C) provides a resin composition that cannot form a crosslinked resin body that generates a smaller amount of secondary decomposition water. Such an amount of the component (C) also provides a crosslinked resin body that experiences increased bleeding.

<Amount of Carbonyl Groups>

In the resin composition of the present invention, the amount of carbonyl groups introduced into the resin composition through the component (B) is $7 \times 10^{-6}$ to $1.3 \times 10^{-5}$ mol/g, preferably $8 \times 10^{-6}$ to $1.1 \times 10^{-5}$ mol/g, relative to the total mass of the component (A), the component (B), and the component (C).

A resin composition wherein the amount of carbonyl groups is less than $7 \times 10^{-6}$ mol/g provides a crosslinked resin body that forms space charges to cause electric field distortion and thus cannot exhibit good DC electrical properties (see Comparative Example 6 and Comparative Example 8 below).

Extruding a resin composition wherein the amount of carbonyl groups is more than $1.3 \times 10^{-5}$ mol/g forms a crosslinked resin body (an insulating layer of a cable) with great variation in thickness (wall thickness deviation), because of an unstable resin pressure (see Comparative Example 7 below).

A great wall thickness deviation leads to an ununiform cable diameter, which significantly makes it difficult to wind a cable on a drum and pay out the cable from the drum.

When the wall thickness deviation is great, the insulation thickness is larger than is necessary because a cable must be designed on the basis of a minimum insulation thickness.

<Component (D)>

The resin composition of the present invention may contain an organic peroxide as the component (D).

The component (D) acts as a crosslinking agent.

The component (D) preferably has a melting point of 60° C. or lower.

When the melting point of the component (D) is higher than 60° C., it is difficult to infiltrate a molten organic peroxide into the composition containing the components (A) to (C).

The decomposition time (half-life) at 130° C. of the component (D) is preferably 1 to 5 hours.

When the decomposition time of the component (D) is less than 1 hour, degradation reaction rapidly proceeds during extrusion of a cable, causing scorching.

When the decomposition time of the component (D) is more than 5 hours, degradation reaction proceeds slowly, the degree of crosslinking is not sufficiently increased during cable processing by a conventional method, and the desired heat resistance is not obtained in a crosslinked body to be obtained.

Specific examples of the component (D) include di-t-hexyl peroxide (PERHEXYL D available from NOF Corporation), dicumyl peroxide (PERCUMYL D available from NOF Corporation), 2,5-dimethyl-2,5-di(t-butylperoxy)hexane (PERHEXA 25B available from NOF Corporation), α,α'-di(t-butylperoxy)diisopropylbenzene (PERBUTYL P available from NOF Corporation), t-butylcumyl peroxide (PERBUTYL C available from NOF Corporation), and di-t-butyl peroxide (PERBUTYL D available from NOF Corporation). These can be used alone or in a combination of two or more. Of these, dicumyl peroxide (melting point: 38° C. to 40° C., half-life at 130° C.: 2 hours) is preferred.

The content of the component (D) is preferably 0.1 to 5 parts by mass, more preferably 0.5 to 3 parts by mass, relative to 100 parts by mass of the component (A).

When the amount of the component (D) is excessively small, crosslinking does not proceed sufficiently, and the mechanical properties and the heat resistance of a crosslinked body to be obtained are reduced. When the amount of the component (D) is excessively large, a resin composition provided suffers scorching when subjected to extrusion molding, leading to low electrical properties.

<Resin Composition>

The resin composition of the present invention contains the components (A) to (C). When the resin composition is crosslinked (a crosslinked resin body is obtained), the resin composition further contains the component (D).

Various stabilizers and other additives may be added as long as the effects of the present invention are not impaired. Examples of stabilizers include antioxidants other than the component (C), light stabilizers, UV absorbers, and copper inhibitors. Examples of other additives include inorganic fillers, organic fillers, lubricants, and dispersants.

<Crosslinked Resin Body>

The resin composition of the present invention can be crosslinked with the organic peroxide that is the component (D).

A crosslinked resin body of the present invention is obtained by crosslinking the resin composition of the present invention with the organic peroxide that is the component (D).

When a sheet made of the crosslinked resin body of the present invention is subjected to space charge measurement, the increase in electric field enhanced by internally accumulated charges is preferably 25% or less.

When space charges are accumulated in a cable insulator as a result of high DC voltage application, insulating properties are significantly reduced if an impulse of reverse polarity is applied or the polarity is reversed.

Thus, when the increase in electric field of the crosslinked resin body is 25% or less, a DC power cable that stably exhibits good DC electrical properties can be obtained.

By crosslinking the resin composition of the present invention wherein the amount of carbonyl groups introduced into the resin composition through the component (B) is 7·$10^{-6}$ mol/g or more relative to the total mass of the component (A), the component (B), and the component (C), a crosslinked body can be obtained wherein the increase in electric field is 25% or less.

To connect cables together, the amount of secondary decomposition water generated when the crosslinked resin body of the present invention is heated needs to be 100 ppm or less.

When the amount of secondary decomposition water is 100 ppm or less, the occurrence of water treeing, which may otherwise occur when the cables are charged, is suppressed, and as a result, the breakdown of the cables can be prevented.

By crosslinking the resin composition of the present invention which contains, as the component (C), 0.01 to 0.8 parts by mass of a stabilizer containing a thioether antioxidant in an amount of 60% by mass or less (containing a hindered phenol antioxidant in an amount of 40% by mass or more), a crosslinked resin body that generates a smaller amount of secondary decomposition water (the amount of water generated by heating at 180° C. for 3 hours is 100 ppm or less) can be formed.

<DC Power Cable>

In a DC power cable of the present invention, an inner semiconductive layer and an insulating layer made of the crosslinked resin body of the present invention are disposed in layers around the surface of a conductive member.

Figure 1:
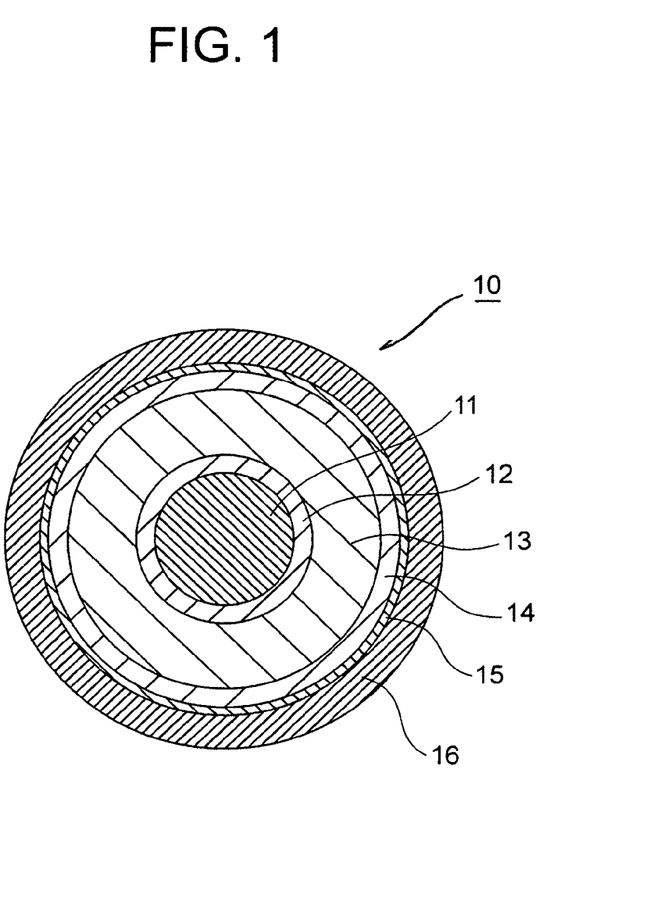
FIG. 1 is a cross-sectional view of a DC power cable according to one embodiment of the present invention.

FIG. 1 is a cross-sectional view of a DC power cable according to one embodiment of the present invention.

In a DC power cable 10 shown in FIG. 1, an inner semiconductive layer 12, an insulating layer 13 made of the crosslinked resin body of the present invention, and an outer semiconductive layer 14 are formed in layers around the outer peripheral surface of a conductor 11.

Furthermore, a metal shielding layer 15 and a sheath 16 are disposed in layers around the outer peripheral surface of the outer semiconductive layer 14.

The DC power cable 10 of the present invention shown in FIG. 1 can be produced by extruding the resin composition of the present invention together with the inner semiconductive layer 12 covering the conductor 11 (the outer semiconductive layer 14 may be extruded together), crosslinking the resin composition to form the insulating layer 13 made of a crosslinked resin body, and then disposing the metal shielding layer 15 and the sheath 16 according to a conventional method.

The crosslinking method for forming the insulating layer 13 (crosslinked resin body) is not particularly limited. Typically, heating under pressure is used, for example.

For example, pressure heating at a temperature of 280° C. under a pressure of 10 kg/cm² is performed in a nitrogen atmosphere to effect a radical reaction in which the component (D) acts as an initiator, thereby allowing crosslinking of the resin composition to proceed.

The DC power cable 10 of the present invention has high circularity, exhibits good DC electrical properties, and is unlikely to experience a breakdown of the insulating layer 13.

<DC Power Cable Joint>

In a DC power cable joint of the present invention, a reinforcing insulating layer made of the crosslinked resin body of the present invention is formed around a joint inner semiconductive layer covering exposed portions of conductive members of the DC power cables, the exposed portions including a joint between the conductive members.

Figure 2:
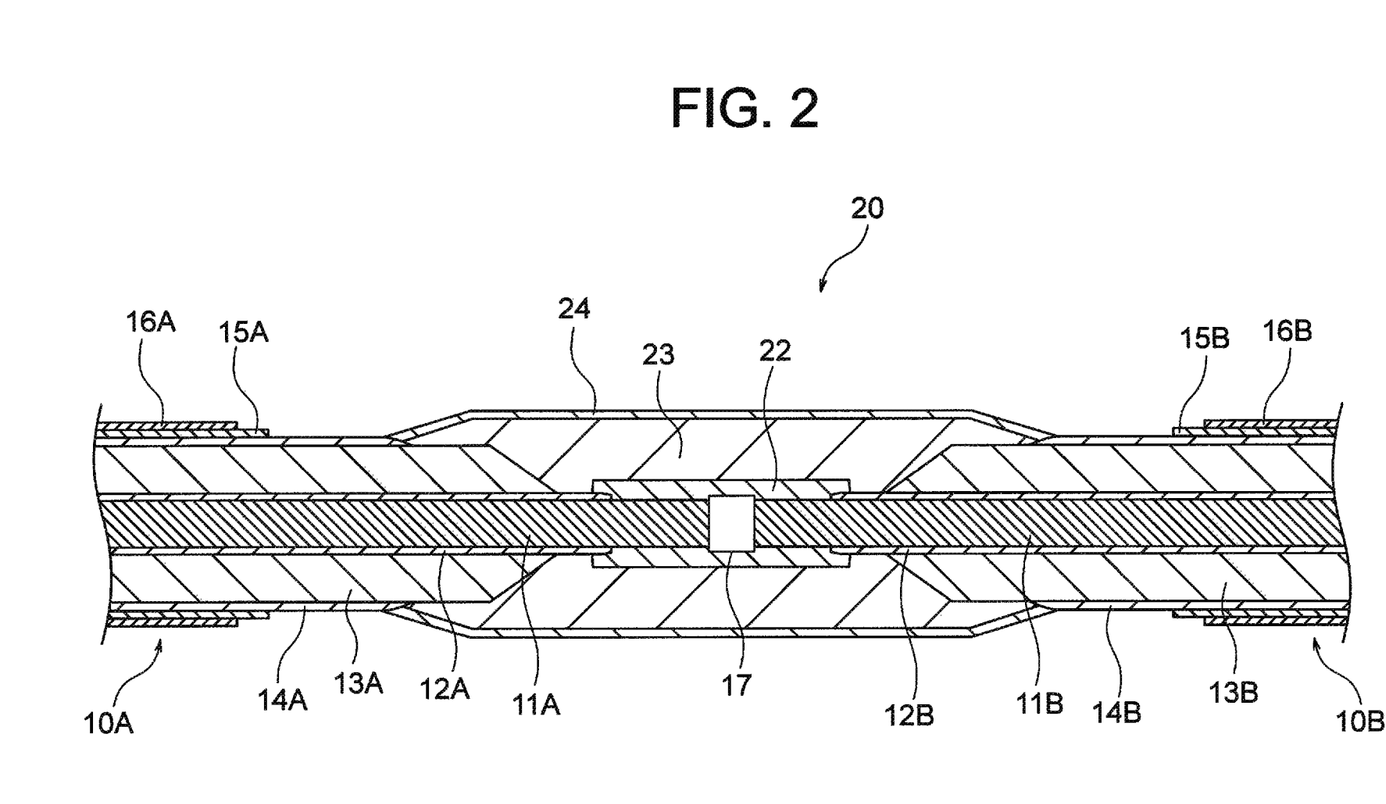
FIG. 2 is a longitudinal sectional view of a DC power cable joint according to one embodiment of the present invention.

FIG. 2 is a longitudinal sectional view of a DC power cable joint according to one embodiment of the present invention.

A DC power cable joint 20 shown in FIG. 2 is where two DC power cables 10A and 10B are connected together. A reinforcing insulating layer 23 made of the crosslinked resin body of the present invention and a joint outer semiconductive layer 24 are formed in layers around a joint inner semiconductive layer 22 covering exposed portions of a conductor 11A of the DC power cable 10A and a conductor 11B of the DC power cable 10B, the exposed portions including a joint 17 between the conductors.

In FIG. 2, 13A is an insulating layer of the DC power cable 10A, and 13B is an insulating layer of the DC power cable 10B. The insulating layers 13A and 13B are made of the crosslinked resin body of the present invention.

Furthermore, 12A, 14A, 15A, and 16A are an inner semiconductive layer, an outer semiconductive layer, a metal shielding layer, and a sheath, respectively, of the DC power cable 10A.

Furthermore, 12B, 14B, 15B, and 16B are an inner semiconductive layer, an outer semiconductive layer, a metal shielding layer, and a sheath, respectively, of the DC power cable 10B.

When the DC power cable 10A and the DC power cable 10B are connected together to form the DC power cable joint 20 as shown in FIG. 2, a tape-shaped member formed of the resin composition of the present invention (a member for forming a reinforcing insulating layer according to the present invention) is wound around the joint inner semiconductive layer 22 covering the exposed portions of the conductor 11A and the conductor 11B, the exposed portions including the joint 17 between the conductors, and the wound body is heat-treated to cause crosslinking, thereby forming the reinforcing insulating layer 23 made of the crosslinked resin body of the present invention.

Although the insulating layer 13A of the DC power cable 10A and the insulating layer 13B of the DC power cable 10B are also heated when the member for forming a reinforcing insulating layer according to the present invention is heat-treated to form the reinforcing insulating layer 23, the amount of secondary decomposition water generated from the insulating layers 13A and 13B can be smaller because the insulating layers 13A and 13B are made of the crosslinked resin body of the present invention.

Furthermore, accumulation of space charges in the reinforcing insulating layer 23 to be formed can be inhibited.

For producing the cable joint, various methods can be employed depending, for example, on the voltage class, the intended use, and the construction environment. The cable joint may be, for example, a taping molded joint (TMJ), an extruded molded joint (EMJ), or a block molded joint (BMJ).

EXAMPLES

The present invention will now be described with reference to examples.

<Analytical Methods>

(1) MFR:

Measurements were Made at a Temperature of 190° C. under a load of 21.18 N in accordance with JIS K 7210.

(2) Density:

Measurements were Made in Accordance with JIS K 7112.

(3) Carbonyl Group Content:
  (3-1) Preparation of Sample
  A resin composition preheated at 120° C. and 1 MPa for 5 minutes was heated at 180° C. and 15 MPa for 15 minutes using a pressing machine to prepare a crosslinked sheet (sheet-shaped crosslinked resin body) having a thickness of about 0.2 mm. The thickness of the crosslinked sheet obtained was accurately measured with a micrometer.
  (3-2) Measurement of Infrared Absorption Spectrum:
  Using an FT/IR-4200 Infrared Spectrophotometer (JASCO Corporation), the absorbance at 1,790 cm$^{-1}$ (base-line: 1,760 to 1,840 cm$^{-1}$) was measured with 16 scans and a resolution of 4 cm$^{-1}$.
  (3-3) Calculation of Carbonyl Group Content:
  Using a calibration curve prepared using a sample of known concentration, the carbonyl group content was calculated from the thickness and the absorbance of the sheet.
(4) Complex Viscosity
  Using an ARES strain-controlled rotational rheometer (TA Instruments), the complex viscosity $\eta^*_{100}$ at a frequency of 0.1 rad/s and the complex viscosity $\eta^*_{100}$ at a frequency of 100 rad/s were measured at a temperature of 130° C. and a parallel plate interval of 1.7 mm.
(5) Amount of Water
  Using an MKC-510 Karl Fischer moisture titrator (KYOTO ELECTRONICS MANUFACTURING CO., LTD.), measurements were made under the following conditions: temperature, 200° C.; carrier gas, (N$_2$); flow rate, 200 mL/min; amount of sample, 1 g.

<Provision of Polyethylene>

Low-density polyethylenes (A1) to (A4) for the present invention obtained by high-pressure tubular processes and having the following MFRs, densities, complex viscosities $\eta^*_{100}$, and ratios ($\eta^*_{0.1}/\eta^*_{100}$) were provided.

(1) Low-Density Polyethylene (A1):
  MFR=1.0 g/min, density=0.92 g/cm$^3$, $\eta^*_{100}$=1,200 Pa·s, ratio ($\eta^*_{0.1}/\eta^*_{100}$)=56.
(2) Low-Density Polyethylene (A2):
  MFR=3.0 g/min, density=0.92 g/cm$^3$, $\eta^*_{100}$=1,030 Pa·s, ratio ($\eta^*_{0.1}/\eta^*_{100}$)=26.
(3) Low-Density Polyethylene (A3):
  MFR=2.0 g/min, density=0.92 g/cm$^3$, $\eta^*_{100}$=1,160 Pa·s, ratio ($\eta^*_{0.1}/\eta^*_{100}$)=34.
(4) Low-Density Polyethylene (A4):
  MFR=4.7 g/min, density=0.92 g/cm$^3$, $\eta^*_{100}$=740 Pa·s, ratio ($\eta^*_{0.1}/\eta^*_{100}$)=26.

Low-density polyethylenes (A5) to (A7) for comparison obtained by low-pressure processes and having the following MFRs, densities, complex viscosities $\eta^*_{100}$, and ratios ($\eta^*_{0.1}/\eta^*_{100}$) were provided.

(5) Low-Density Polyethylene (A5):
  MFR=1.0 g/min, density=0.92 g/cm$^3$, $\eta^*_{100}$=3,210 Pa·s, ratio ($\eta^*_{0.1}/\eta^*_{100}$)=8.
(6) Low-Density Polyethylene (A6):
  MFR=2.3 g/min, density=0.92 g/cm$^3$, $\eta^*_{100}$=2,250 Pa·s, ratio ($\eta^*_{0.1}/\eta^*_{100}$)=6.
(7) Low-Density Polyethylene (A7):
  MFR=8.5 g/min, density=0.92 g/cm$^3$, $\eta^*_{100}$=1,160 Pa·s, ratio ($\eta^*_{0.1}/\eta^*_{100}$)=3.

Preparation of Modified Polyethylene (1) Preparation Example B1

According to the formulation shown in Table 1 below, 0.5 parts by mass of maleic anhydride and 0.05 parts by mass of a hindered phenol antioxidant were added to 100 parts by mass of the low-density polyethylene (A2), and the resultant was mixed with 0.02 parts by mass of 2,5-dimethyl-2,5-bis(tertiarybutylperoxy)hexyne-3 (organic peroxide, "PER-HEXYNE 25B" available from NOF Corporation) in an extruder and reacted by heating, thereby preparing a modified polyethylene (B1) formed of a graft copolymer having a carbonyl group content of 7.75×10$^{-5}$ mol/g.

(2) Preparation Example B2

A modified polyethylene (B2) formed of a graft copolymer having a carbonyl group content of 7.75×10$^{-5}$ mol/g was prepared in the same manner as in Preparation Example B1 except that the low-density polyethylene (A3) was used in place of the low-density polyethylene (A2) according to the formulation shown in Table 1 below.

(3) Preparation Example B3

A modified polyethylene (B3) formed of a graft copolymer having a carbonyl group content of 1.163×10$^{-4}$ mol/g was prepared in the same manner as in Preparation Example B1 except that the amounts of maleic anhydride and organic peroxide used were changed according to the formulation shown in Table 1 below.

(4) Preparation Example B4

A modified polyethylene (B4) formed of a graft copolymer having a carbonyl group content of 1.428×10$^{-4}$ mol/g was prepared in the same manner as in Preparation Example B1 except that the amounts of maleic anhydride and organic peroxide used were changed according to the formulation shown in Table 1 below.

(5) Preparation Example B5

A modified polyethylene (B5) formed of a graft copolymer having a carbonyl group content of 4.89×10$^{-5}$ mol/g was prepared in the same manner as in Preparation Example B1 except that the amounts of maleic anhydride and organic peroxide used were changed according to the formulation shown in Table 1 below.

(6) Preparation Example B6

A modified polyethylene (B6) formed of a graft copolymer having a carbonyl group content of 3.814×10$^{-4}$ mol/g was prepared in the same manner as in Preparation Example B1 except that the amounts of maleic anhydride and organic peroxide used were changed according to the formulation shown in Table 1 below.

TABLE 1

| Preparation Example | B1 | B2 | B3 | B4 | B5 | B6 |
|---|---|---|---|---|---|---|
| Low-density polyethylene (A2) | 100 | | 100 | 100 | 100 | 100 |
| Low-density polyethylene (A3) | | 100 | | | | |
| Maleic anhydride | 0.50 | 0.50 | 0.65 | 1.00 | 0.25 | 2.00 |

TABLE 1-continued

| Preparation Example | B1 | B2 | B3 | B4 | B5 | B6 |
|---|---|---|---|---|---|---|
| Hindered phenol antioxidant | 0.05 | 0.05 | 0.05 | 0.05 | 0.05 | 0.05 |
| Organic peroxide * | 0.02 | 0.02 | 0.026 | 0.04 | 0.01 | 0.08 |
| Carbonyl group content [$10^{-6}$ mol/g] | 77.5 | 77.5 | 116.3 | 142.8 | 48.9 | 381.4 |

* "PERHEXYNE 25B" (NOF Corporation)

<Provision of Antioxidant>
(1) Stabilizer (C1):
A mixture of 50% by mass of a hindered phenol antioxidant (C11) described in (2) below and 50% by mass of a thioether antioxidant (C12) described in (3) below was prepared for use as a stabilizer for the present invention.
(2) Stabilizer (C11):
An Irganox 1010 hindered phenol antioxidant (BASF) was provided for use as a stabilizer for comparison.
(3) Stabilizer (C12):
A SEENOX BCS thioether antioxidant (SHIPRO KASEI KAISHA, LTD.) was provided for use as a stabilizer for comparison.

Examples 1 to 8

According to the formulations shown in Table 2 below, resin compositions of the present invention were each obtained by mixing a component (A) selected from the low-density polyethylenes (A1) to (A4), a component (B) selected from the modified polyethylenes (B1) to (B4), a component (C) including the stabilizer (C1), and a component (D) including dicumyl peroxide.

Comparative Example 1

A resin composition for comparison was obtained in the same manner as in Example 1 except that the low-density polyethylene (A5) was used in place of the low-density polyethylene (A1) according to the formulation shown in Table 3 below.
This comparative example is a comparative example in which a low-density polyethylene having an $\eta^*_{100}$ of more than 1,300 Pa·s is used.

Comparative Example 2

A resin composition for comparison was obtained in the same manner as in Example 1 except that the low-density polyethylene (A6) was used in place of the low-density polyethylene (A1) according to the formulation shown in Table 3 below.
This comparative example is a comparative example in which a low-density polyethylene having an $\eta^*_{100}$ of more than 1,300 Pa·s is used.

Comparative Example 3

A resin composition for comparison was obtained in the same manner as in Example 1 except that the low-density polyethylene (A7) was used in place of the low-density polyethylene (A1) according to the formulation shown in Table 3 below.
This comparative example is a comparative example in which a low-density polyethylene having a ratio ($\eta^*_{0.1}/\eta^*_{100}$) of less than 4 is used.

Comparative Example 4

A resin composition for comparison was obtained in the same manner as in Example 5 except that 0.4 parts by mass of the stabilizer (C11) was used in place of the stabilizer (C1) according to the formulation shown in Table 3 below.
This comparative example is a comparative example in which a hindered phenol antioxidant alone is used as a stabilizer.

Comparative Example 5

A resin composition for comparison was obtained in the same manner as in Example 5 except that 0.4 parts by mass of the stabilizer (C12) was used in place of the stabilizer (C1) according to the formulation shown in Table 3 below.
This comparative example is a comparative example in which a thioether antioxidant alone is used as a stabilizer.

Comparative Example 6

A resin composition for comparison was obtained in the same manner as in Example 1 except that the modified polyethylene (B5) was used in place of the modified polyethylene (B1) according to the formulation shown in Table 3 below.
This comparative example is a comparative example in which the amount of carbonyl groups relative to the total mass of the component (A), the component (B), and the component (C) is less than $7 \times 10^{-6}$ mol/g.

Comparative Example 7

A resin composition for comparison was obtained in the same manner as in Example 1 except that the modified polyethylene (B6) was used in place of the modified polyethylene (B1) according to the formulation shown in Table 3 below.
This comparative example is a comparative example in which the amount of carbonyl groups relative to the total mass of the component (A), the component (B), and the component (C) is more than $1.3 \times 10^{-5}$ mol/g.

Comparative Example 8

A resin composition for comparison was obtained in the same manner as in Example 1 except that the modified polyethylene (B1) was not used according to the formulation shown in Table 3 below.
<Evaluation>
On each of the resin compositions obtained in Examples and Comparative Examples above were performed an evaluation of extrudability (a measurement of torque), an evaluation of sagging resistance, evaluation of scorch resistance, a measurement of the amount of secondary decomposition water of a crosslinked resin body formed from a resin composition, an evaluation of space charge properties of a crosslinked resin body formed from a resin composition (a measurement of an increase in electric field enhanced by internally accumulated charges), a measurement of a DC breakdown electric field of a cable including as an insulating layer a crosslinked resin body formed from a resin composition, an evaluation of extrusion stability (a measurement of resin pressure regulation and wall thickness deviation), and a measurement of a DC breakdown electric field of DC power cables connected together through a DC power cable joint including as a reinforcing insulating layer a crosslinked resin body formed from a resin composition.

Measurement methods, evaluation methods, and evaluation criteria are as described in the following (1) to (8).

Results are shown in Table 2 and Table 3 below.

(1) Evaluation of Extrudability (Measurement of Torque):

The same resin compositions as those of Examples 1 to 7 and Comparative Examples 1 to 8 were prepared, except that the dicumyl peroxide that was the component (D) was not added. Each of the resin compositions obtained was extruded using a LABO PLASTOMILL 20C200 (Toyo Seiki Seisaku-Sho, Ltd.) with the extruder temperature set at 130° C./130° C./130° C./130° C. (C1/C2/C3/Die) under the following conditions: screen mesh (80/200/80 from upstream to downstream), screw (L/D=24, compression ratio=2.5), screw speed (30 rpm). The torque generated during the extrusion was measured.

The evaluation criteria are as follows: 25 to 60 N·m, acceptable; less than 25 N·m or more than 60 N·m, unacceptable.

When the torque is less than 25 N·m, the resin composition (extrudate) discharged from an extruder head sags due to its own weight to provide a cable insulator with low circularity, resulting in very low electrical insulation properties. When the torque is more than 60 N·m, the extruder is subjected to a heavy load.

(2) Evaluation of Sagging Resistance:

Each of the resin compositions obtained in Examples 1 to 7 and Comparative Examples 1 to 8 was preheated at 130° C. and 1 MPa for 3 minutes and then pressed at 130° C. and 15 MPa for 2 minutes to form an uncrosslinked sheet of 150 mm×180 mm×1 mm.

A test specimen 5A in accordance with JIS K 7162 was punched from the uncrosslinked sheet.

The test specimen was marked with gauge lines at intervals of 20 mm and exposed in a chamber at a temperature of 190° C. for 10 minutes. The gauge length after the exposure for 10 minutes was measured.

The evaluation criteria are as follows: the gauge length is 20 to 60 mm, acceptable; the gauge length is more than 60 mm, unacceptable.

When the gauge length is more than 60 mm, the resin composition (extrudate) discharged from an extruder head sags due to its own weight to provide a cable insulator with low circularity, resulting in very low electrical insulation properties.

(3) Scorch Resistance:

On each of the resin compositions obtained in Example 5 and Comparative Examples 4 and 5, a measurement at a testing temperature of 140° C. for 8 hours was performed using a moving die rheometer (MDR) in accordance with JIS K 6300-2. The time ts1 taken for torque to increase from a minimum value by 1 dNm was measured.

The evaluation criteria are as follows: ts1 is 45 minutes or more, acceptable; ts1 is 45 minutes or less, unacceptable.

(4) Measurement of Amount of Secondary Decomposition Water:

The resin compositions obtained in Example 5 and Comparative Examples 4 and 5 were each pressed at 170° C. and 5 MPa for 60 minutes to form crosslinked sheets (crosslinked resin bodies) of 150 mm×180 mm×10 mm. Each of the crosslinked sheets obtained was heated at 180° C. for 3 hours. The amount of water generated as a result of the heating was measured by the Karl Fischer method.

The evaluation criteria are as follows: 100 ppm or less, acceptable; more than 100 ppm, unacceptable.

(5) Evaluation of Space Charge Properties:

The resin compositions obtained in Example 1, Examples 5 to 7, and Comparative Examples 6 to 8 were each pressed at 120° C. and 1 MPa for 10 minutes into a sheet shape and then pressed at 170° C. and 5 MPa for 30 minutes to form crosslinked sheets (crosslinked resin bodies) each having a thickness of 0.3 mm.

Each of the crosslinked sheets obtained was evaluated for space charge properties by a pulsed electro-acoustic (PEA) method. A direct electric field at a temperature of 90° C. and a negative polarity of 30 kV/mm was continuously applied to the crosslinked sheet for about 48 hours.

The evaluation criteria are as follows: the increase in electric field (maximum electric field/applied electric field) is 25% or less, acceptable; the increase in electric field is more than 25%, unacceptable.

(6) Measurement of DC Breakdown Electric Field of Cable:

On the outer peripheral surface of a conductor (11) having a sectional area of 2 mm$^2$, an inner semiconductive layer (12) having a thickness of 0.5 mm, a resin layer (an uncrosslinked resin layer for forming an insulating layer (13)) having a thickness of 1 mm and made of each of the resin compositions obtained in Example 1, Examples 5 to 7, and Comparative Examples 6 to 8, and an outer semiconductive layer (14) having a thickness of 0.6 mm were formed in layers by extrusion coating. The resin composition was then crosslinked by performing a heat treatment in a nitrogen atmosphere at a temperature of 260° C. for 2.5 minutes to form the insulating layer (13), thereby producing a 25 m long miniature cable having a sectional configuration as shown in FIG. 1.

The miniature cable obtained was cut crosswise at a point 10 m backward from the front end and a point 10 m forward from the back end. Both ends of the 5 m central portion of the miniature cable were subjected to an end treatment and connected to a DC breakdown tester to perform a DC breakdown test. The voltage was stepped up from a starting voltage of −50 kV at a rate of −2 kV/min while adjusting the conductor temperature of the miniature cable to be 90° C. in an oil bath, and the electric field at which a breakdown occurred was measured.

The evaluation criteria are as follows: the breakdown electric field is −160 kV/mm or less (its absolute value is 160 kV/mm or more), acceptable; the breakdown electric field is higher than −160 kV/mm (its absolute value is less than 160 kV/mm), unacceptable.

(7) Evaluation of Extrusion Stability (Measurement of Resin Pressure Regulation and Wall Thickness Deviation):

In producing the miniature cable of (6) above, the resin pressure was measured over time, and the resin pressure regulation was determined by the following formula. The evaluation criteria are as follows: the resin pressure regulation is 3% or less, acceptable; the resin pressure regulation is more than 3%, unacceptable.

Resin pressure regulation (%)=[(maximum pressure−minimum pressure)/maximum pressure]×100

For each of the two sections (cross sections) of the miniature cable cut crosswise in (6) above, the insulating layer thickness was measured in six circumferential directions (60° intervals), and the wall thickness deviation was determined by the following formula. The evaluation criteria are as follows: the wall thickness deviation is 15% or less, acceptable; the wall thickness deviation is more than 15%, unacceptable.

Wall thickness deviation (%)=[(maximum insulating layer thickness−minimum insulating layer thickness)/maximum insulating layer thickness]×100

(8) Measurement of DC Breakdown Electric Field of DC Power Cables Connected Together Through DC Power Cable Joint:

(8-1) Connection of DC Power Cables (Formation of DC Power Cable Joint):

The outer peripheral surface of a conductor (11) having a sectional area of 200 mm$^2$ was coated with an inner semiconductive layer (12) having a thickness of 1 mm, an insulating layer (13) having a thickness of 3 mm and made of a crosslinked body of each of the resin compositions obtained in Example 1, Examples 5 to 7, and Comparative Example 8, and an outer semiconductive layer (14) having a thickness of 1 mm. Around the outer peripheral surface of the outer semiconductive layer (14), a metal shielding layer (15) and a sheath (16) were disposed in layers to form a DC power cable. For each example, two DC power cables, ten in total, were formed.

One end of each of two DC power cables (10A, 10B) including insulating layers (13A, 13B) made of the same crosslinked resin body was cut into a substantially conical shape, and exposed conductors (11A, 11B) were then connected together with the conical ends facing each other.

Subsequently, a semiconductive tape (a member for forming a joint inner semiconductive layer) was wound around the exposed portions of the conductors (11A, 11B) connected together. A tape-shaped member for forming a reinforcing insulating layer was wound around the semiconductive tape, the tape-shaped member being made of each of the resin compositions obtained in Example 1, Examples 5 to 7, and Comparative Example 8 (each of the resin compositions has the same composition as that of the resin composition used to form the crosslinked resin body constituting the insulating layers (13A, 13B) of DC power cables to be connected together). The outer periphery of the member for forming a reinforcing insulating layer was coated with a semiconductive shrinkable tube (a member for forming a joint outer semiconductive layer).

The member for forming a joint inner semiconductive layer, the member for forming a reinforcing insulating layer, and the member for forming a joint outer semiconductive layer were then crosslinked by performing a heat treatment in a nitrogen atmosphere at 220° C. for 3 hours, thereby forming a DC power cable joint (20) in which a joint inner semiconductive layer (22) having a thickness of 1.6 mm, a reinforcing insulating layer (23) having a thickness of 4 mm, and a joint outer semiconductive layer (24) having a thickness of 1.6 mm were formed in layers around the exposed portions of the conductors (11A, 11B), as shown in FIG. 2 (the thickness of each layer is different from those in FIG. 2).

The length of the joint outer semiconductive layer (24) was 760 mm, and a crosslinking tube having a length of 1,150 mm was used in the heat treatment.

(8-2) Measurement of DC Breakdown Electric Field:

A DC breakdown test was performed on the two DC power cables (10A, 10B) which included the insulating layers (13A, 13B) made of a crosslinked body of each of the resin compositions obtained in Example 1, Examples 5 to 7, and Comparative Example 8 and which were connected together through the DC power cable joint (20) in which the reinforcing insulating layer (23) was formed using a resin composition having the same composition as that of the resin composition used to form the crosslinked resin body constituting the insulating layers (13A, 13B). The voltage was stepped up from a starting voltage of −60 kV at a rate of −20 kV/10 min while adjusting the conductor temperature to be 90° C. The breakdown electric field was measured, and the breakdown site was determined.

The evaluation criteria are as follows: the breakdown electric field is −65 kV/mm or less (its absolute value is 65 kV/mm or more), acceptable; the breakdown electric field is higher than −65 kV/mm (its absolute value is less than 65 kV/mm), unacceptable.

Cables each having an overall length of 20 m including a DC power cable joint were evaluated using test lines.

In every two DC power cables connected together through any of the DC power cable joints, a breakdown was observed at the DC power cable joint.

As shown in Table 2 and Table 3 below, the breakdown electric fields of the two DC power cables connected together through the DC power cable joints according to Example 1 and Examples 5 to 7 were around −75 kV/mm, which was about twice the breakdown electric field (−40 kV/mm) of the two DC power cables connected together through the DC power cable joint according to Comparative Example 8.

TABLE 2

| | | Example 1 | Example 2 | Example 3 | Example 4 | Example 5 | Example 6 | Example 7 |
|---|---|---|---|---|---|---|---|---|
| (A) | Low-density polyethylene (A1) | 100 | — | — | — | 100 | 100 | 100 |
| | Low-density polyethylene (A2) | — | 100 | — | — | — | — | — |
| | Low-density polyethylene (A3) | — | — | 100 | — | — | — | — |
| | Low-density polyethylene (A4) | — | — | — | 100 | — | — | — |
| (B) | Modified polyethylene (B1) | — | — | — | — | 10 | — | — |
| | Modified polyethylene (B2) | — | — | — | — | — | 10 | — |
| | Modified polyethylene (B3) | 10 | 10 | 10 | 10 | — | — | — |
| | Modified polyethylene (B4) | — | — | — | — | — | — | 10 |
| (C) | Stabilizer (C1) *1 | 0.4 | 0.4 | 0.4 | 0.4 | 0.4 | 0.4 | 0.4 |
| (D) | Organic peroxide *2 | 1.7 | 1.7 | 1.7 | 1.7 | 1.7 | 1.7 | 1.7 |
| Amount of >C = O/(A) + (B) + (C) [·10$^{-6}$ mol/g] | | 9.5 | 9.5 | 9.5 | 9.5 | 7.8 | 7.8 | 12.8 |
| Extrudability | Extrusion torque [N · m] | 54 | 40 | 48 | 42 | 51 | 52 | 58 |
| | Evaluation | acceptable | acceptable | acceptable | acceptable | acceptable | acceptable | acceptable |
| Sagging resistance | Post-exposure gauge length [mm] | 23 | 46 | 30 | 45 | 23 | 23 | 23 |
| | Evaluation | acceptable | acceptable | acceptable | acceptable | acceptable | acceptable | acceptable |

TABLE 2-continued

|  |  | Example 1 | Example 2 | Example 3 | Example 4 | Example 5 | Example 6 | Example 7 |
|---|---|---|---|---|---|---|---|---|
| Scorch resistance | ts1 [min] | — | — | — | — | 51 | — | — |
|  | Evaluation | — | — | — | — | acceptable | — | — |
| Amount of secondary decomposition water [ppm] |  | — | — | — | — | 60 | — | — |
| Evaluation |  | — | — | — | — | acceptable | — | — |
| Space charge properties | Increase in electric field [%] | 6 | — | — | — | 8 | 7 | 10 |
|  | Evaluation | acceptable | — | — | — | acceptable | acceptable | acceptable |
| DC breakdown electric field of cable [kV/mm] |  | −196 | — | — | — | −175 | −190 | −200 |
| Evaluation |  | acceptable | — | — | — | acceptable | acceptable | acceptable |
| Extrusion stability | Resin pressure regulation [%] | 2.5 | — | — | — | 2.2 | 2.3 | 2.7 |
|  | Evaluation | acceptable | — | — | — | acceptable | acceptable | acceptable |
|  | Wall thickness deviation [%] | 15 | — | — | — | 12 | 12 | 15 |
|  | Evaluation | acceptable | — | — | — | acceptable | acceptable | acceptable |
|  | Evaluation of extrusion stability | acceptable | — | — | — | acceptable | acceptable | acceptable |
| DC breakdown electric field of cables connected together [kV/mm] |  | −80 | — | — | — | −75 | −73 | −85 |
| Breakdown site |  | joint | — | — | — | joint | joint | joint |
|  | Evaluation | acceptable | — | — | — | acceptable | acceptable | acceptable |

TABLE 3

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| (A) | Low-density polyethylene (A1) | — | — | — | 100 | 100 | 100 | 100 | 100 |
|  | Low-density polyethylene (A5) | 100 | — | — | — | — | — | — | — |
|  | Low-density polyethylene (A6) | — | 100 | — | — | — | — | — | — |
|  | Low-density polyethylene (A7) | — | — | 100 | — | — | — | — | — |
| (B) | Modified polyethylene (B1) | — | — | — | 10 | 10 | — | — | — |
|  | Modified polyethylene (B3) | 10 | 10 | 10 | — | — | — | — | — |
|  | Modified polyethylene (B5) | — | — | — | — | — | 10 | — | — |
|  | Modified polyethylene (B6) | — | — | — | — | — | — | 10 | — |
| (C) | Stabilizer (C1) *1 | 0.4 | 0.4 | 0.4 | — | — | 0.4 | 0.4 | 0.4 |
|  | Stabilizer (C11) *3 | — | — | — | 0.4 | — | — | — | — |
|  | Stabilizer (C12) *4 | — | — | — | — | 0.4 | — | — | — |
| (D) | Organic peroxide *2 | 1.7 | 1.7 | 1.7 | 1.7 | 1.7 | 1.7 | 1.7 | 1.7 |
| Amount of >C = O/ (A) + (B) + (C) ['$10^{-6}$ mol/g] |  | 9.5 | 9.5 | 9.5 | 7.9 | 8.0 | 4.9 | 38.1 | 0 |
| Extrudability | Extrusion torque [N · m] | 100 | 77 | 53 | 51 | 51 | 49 | 70 | 48 |
|  | Evaluation | unacceptable | unacceptable | acceptable | acceptable | acceptable | acceptable | unacceptable | acceptable |
| Sagging resistance | Post-exposure gauge length [mm] | 25 | 41 | broken | 23 | 23 | 23 | 22 | 23 |
|  | Evaluation | acceptable | acceptable | unacceptable | acceptable | acceptable | acceptable | acceptable | acceptable |
| Scorch resistance | ts1 [min] | — | — | — | 36 | 58 | — | — | — |
|  | Evaluation | — | — | — | unacceptable | acceptable | — | — | — |
| Amount of secondary |  | — | — | — | 40 | 1000 | — | — | — |

TABLE 3-continued

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| decomposition water [ppm] | | | | | | | | | |
| Evaluation | | — | — | — | acceptable | unacceptable | — | — | — |
| Space charge properties | Increase in electric field [%] | — | — | — | — | — | 28 | 7 | 62 |
| | Evaluation | — | — | — | — | — | unacceptable | acceptable | unacceptable |
| DC breakdown electric field of cable [kV/mm] | | — | — | — | — | — | −152 | −205 | −150 |
| Evaluation | | — | — | — | — | — | unacceptable | acceptable | unacceptable |
| Extrusion stability | Resin pressure regulation [%] | — | — | — | — | — | 2.1 | 3.3 | 2.1 |
| | Evaluation | — | — | — | — | — | acceptable | unacceptable | acceptable |
| | Wall thickness deviation [%] | — | — | — | — | — | 12 | 20 | 12 |
| | Evaluation | — | — | — | — | — | acceptable | unacceptable | acceptable |
| | Evaluation of extrusion stability | — | — | — | — | — | acceptable | unacceptable | acceptable |
| DC breakdown electric field of cables connected together [kV/mm] | | — | — | — | — | — | — | — | −40 |
| Breakdown site | | — | — | — | — | — | — | — | joint |
| | Evaluation | — | — | — | — | — | — | — | unacceptable |

*1: mixture of 50% by mass of hindered phenol antioxidant and 50% by mass of thioether antioxidant
*2: dicumyl peroxide
*3: hindered phenol antioxidant
*4: thioether antioxidant

REFERENCE SIGNS LIST 10, 10A, 10B DC power cable
11, 11A, 11B conductor
12, 12A, 12B inner semiconductive layer
13, 13A, 13B insulating layer
14, 14A, 14B outer semiconductive layer
15, 15A, 15B metal shielding layer
16, 16A, 16B sheath
17 conductor joint
20 DC power cable joint
22 joint inner semiconductive layer
23 reinforcing insulating layer
24 joint outer semiconductive layer

The invention claimed is:

1. An insulating resin composition for a DC power cable, the resin composition comprising:
(A) 100 parts by mass of a low-density polyethylene having a complex viscosity $\eta^*_{100}$, which is measured at 130° C. and a frequency of 100 rad/s, of 600 to 1,300 Pa·s, wherein a ratio ($\eta^*_{0.1}/\eta^*_{100}$) of a complex viscosity $\eta^*_{0.1}$, which is measured at 130° C. and a frequency of 0.1 rad/s, to the complex viscosity $\eta^*_{100}$ is 4 or more;
(B) 5 to 12 parts by mass of a modified polyethylene obtained by grafting a polyethylene with at least one modifying monomer selected from unsaturated organic acids and derivatives thereof; and
(C) 0.01 to 0.8 parts by mass of a stabilizer including a mixture of 40% to 60% by weight of a hindered phenol antioxidant and 60% to 40% by weight of a thioether antioxidant,
wherein an amount of carbonyl groups introduced into the resin composition through the component (B) is $7\times10^{-6}$ to $1.3\times10^{-5}$ mol/g relative to a total mass of the component (A), the component (B), and the component (C).

2. The resin composition for a DC power cable according to claim 1, wherein the component (B) is obtained by grafting a low-density polyethylene that satisfies the requirements for the component (A) with the modifying monomer.

3. The insulating resin composition for a DC power cable according to claim 1, further comprising (D) 0.1 to 5 parts by mass of an organic peroxide.

4. The insulating resin composition for a DC power cable according to claim 3,
wherein the component (D) has a melting point of 60° C. or lower, and
a decomposition time (half-life) at 130° C. of the component (D) is 1 to 5 hours.

5. The insulating resin composition for a DC power cable according to claim 1, wherein the component (B) is a modified polyethylene obtained by grafting a polyethylene with at least one modifying monomer selected from unsaturated dicarboxylic acids, unsaturated dicarboxylic anhydrides, and unsaturated dicarboxylic acid derivatives.

6. The insulating resin composition for a DC power cable according to claim 1, wherein the component (B) is a modified polyethylene obtained by grafting a polyethylene with maleic anhydride (MAH).

7. A crosslinked resin body obtained by crosslinking the resin composition according to claim 1.

8. The crosslinked resin body according to claim 7, wherein an amount of water generated by heating at 180° C. for 3 hours is 100 ppm or less.

9. The crosslinked resin body according to claim 7, wherein an increase in electric field enhanced by internally accumulated charges is 25% or less, the increase in electric field being determined by space charge measurement.

10. A DC power cable, wherein an inner semiconductive layer and an insulating layer made of the crosslinked resin body according to claim 7 are disposed in layers around a surface of a conductive member.

11. A member for forming a reinforcing insulating layer of a DC power cable joint, the member comprising the resin composition according to claim 1, wherein the member is a tape-shaped repair member that, in connecting DC power cables together, is wound around a joint inner semiconductive layer covering exposed portions of conductive members of the DC power cables, the exposed portions including a joint between the conductive members, and is crosslinked to form a reinforcing insulating layer around the joint inner semiconductive layer.

12. A DC power cable joint, wherein DC power cables are connected together, and a reinforcing insulating layer made of the crosslinked resin body according to claim 7 is formed around a joint inner semiconductive layer covering exposed portions of conductive members of the DC power cables, the exposed portions including a joint between the conductive members.

\* \* \* \* \*